United States Patent [19]
Chauvel

[11] Patent Number: 5,156,421
[45] Date of Patent: Oct. 20, 1992

[54] FLUID-TIGHT CONNECTORS FOR FLUID-CARRYING PIPE-LINES

[75] Inventor: Michel Chauvel, Le Mans, France

[73] Assignee: Simmonds S.A., France

[21] Appl. No.: 648,928

[22] Filed: Feb. 1, 1991

[30] Foreign Application Priority Data

Feb. 5, 1990 [FR] France .................................. 9001303

[51] Int. Cl.$^5$ ............................................. F16L 35/00
[52] U.S. Cl. ....................................... 285/40; 285/92; 285/332.1; 285/354; 411/302
[58] Field of Search ..................... 285/40, 89, 9 2, 246, 285/247, 353, 354, 332.2, 357; 411/301, 302, 303, 304, 305, 306, 308, 324

[56] References Cited

U.S. PATENT DOCUMENTS

| | | | |
|---|---|---|---|
| 2,320,031 | 5/1943 | Donforth | 411/302 X |
| 2,497,273 | 2/1950 | Richardson | 285/354 X |
| 2,499,104 | 2/1950 | Lovell | 285/92 |
| 3,429,593 | 2/1969 | Seablom | 285/247 |

FOREIGN PATENT DOCUMENTS

| | | |
|---|---|---|
| 1793181 | 8/1959 | Fed. Rep. of Germany . |
| 1993757 | 9/1968 | Fed. Rep. of Germany . |
| 2650301 | 5/1978 | Fed. Rep. of Germany . |
| 832419 | 9/1938 | France ................................ 285/353 |
| 104275 | 10/1926 | Sweden . |
| 296636 | 9/1928 | United Kingdom ................ 411/302 |

OTHER PUBLICATIONS

French Patent Office Search Report No. 9001303 dated Feb. 5, 1990.

*Primary Examiner*—Dave W. Arola
*Attorney, Agent, or Firm*—Ostrolenk, Faber, Gerb & Soffen

[57] ABSTRACT

A pipe connector comprising two members with respectively concave and convex mating co-operating ends and fitting together by an internally threaded sleeve retaining one of the members and tightened by being screwed onto the outer threading of the other member, this outer threading being extended by a threaded portion having a greater diameter than and the same pitch as those of the outer threading and being adapted to co-operate with a lock washer retained in a recessing formed in one of the ends of the sleeve.

7 Claims, 2 Drawing Sheets

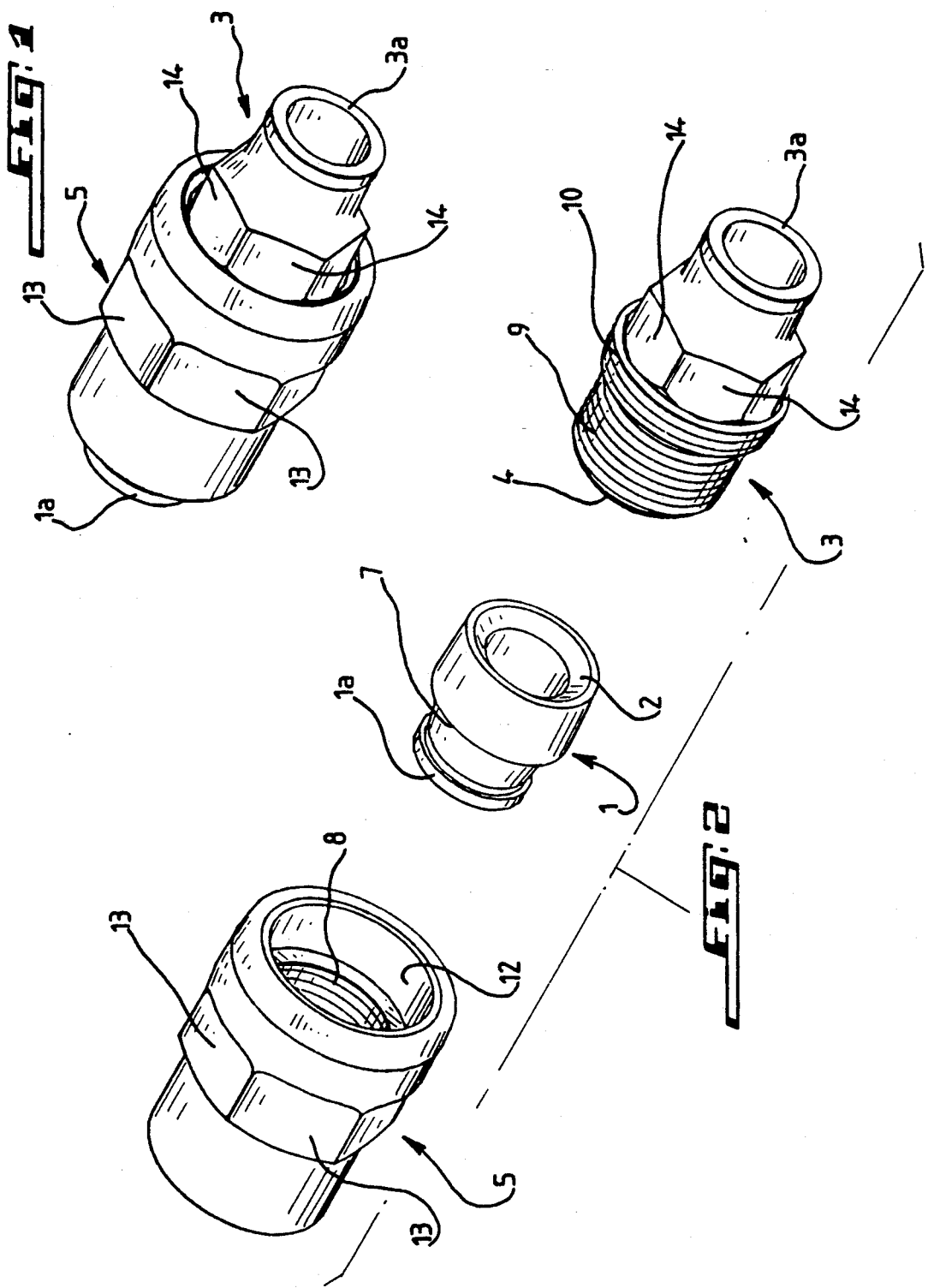

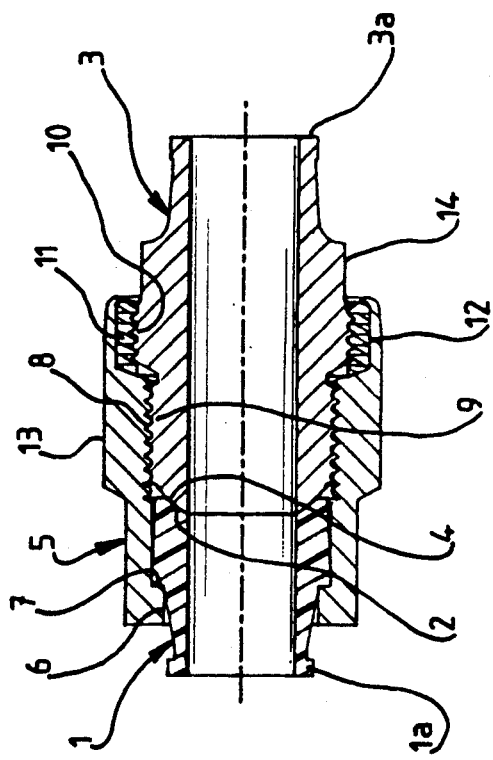
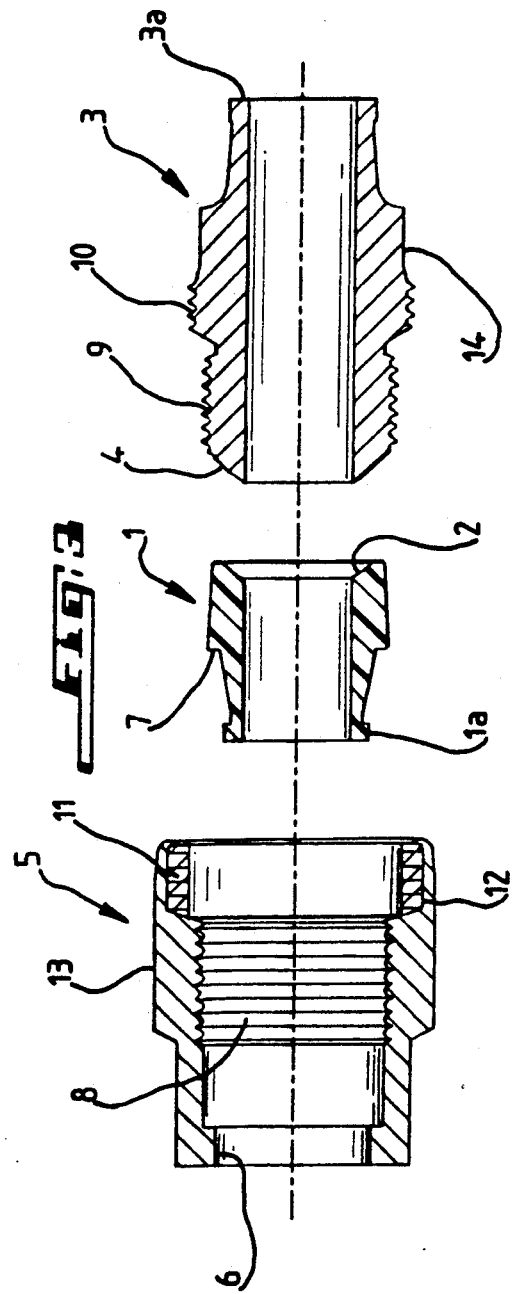

FLUID-TIGHT CONNECTORS FOR FLUID-CARRYING PIPE-LINES

The present invention relates essentially to an improved fluid-tight connector or like fitting for pipe-lines for conveying any fluids whatsoever such for instance as fuel for a combustion engine.

There are already known fluid-tight connecting or coupling devices for pipe-lines essentially comprising two parts with respectively convex and concave co-operating, mating or complementary ends, these two parts being joined together by an inside threaded sleeve retaining one of the parts and tightened by being screwed onto the other part.

In such connectors, couplers or like fittings the locking after screwing and tightening of the sleeve was generally provided by a locking wire extending through the connector and therefore exhibiting inconveniences. When indeed the connector undergoes vibrations or other forces or stresses the locking wire may break and therefore become inoperative so that the locking of the various parts forming the connector is far from being perfect. This means that the connector would become untightened with all the possible troublesome consequences resulting therefrom and among which may be mentioned the risks of substantial leaks and the fire hazards in the case where the pipe-lines coupled together provide for the flow of fuel. The object of the present invention is to cope in particular with these drawbacks by providing an improved fluid-tight connector, coupler or like fitting which always remains in locked position whatever the stresses or forces it undergoes may be and the mounting or assembly of which remains simple, convenient and quick.

For that purpose the subject matter of the invention is an improved fluid-tight connector for pipe-lines carrying any fluids whatsoever and of the type comprising two parts with respective convex and concave co-operating mating or complementary ends and joined together by an inside threaded sleeve retaining one of the parts and tightened by being screwed onto the outer threading provided on the other part, characterized in that the outer threading of the other part is extended by a threaded portion which has a greater diameter than that of said outer threading and which is adapted to co-operate with a self-locking or self-stopping washer kept in a recessing formed in the sleeve following the inner threaded portion of this sleeve and the inner periphery of which has a greater diameter than that of the inner threaded portion of the sleeve.

According to a preferred embodiment the aforesaid threaded portion and the outside threading of the aforesaid other part have a same pitch or thread.

The invention will be better understood and further objects, characterizing features, details and advantages thereof will better appear as the following explanatory description proceeds with reference to the accompanying diagrammatic drawings give by way of non limiting example only illustrating one presently preferred specific embodiment of the invention and wherein:

FIG. 1 is a perspective view of a connector according to the invention in the mounted and tightened position;

FIG. 2 is a perspective exploded view of this connector;

FIG. 3 is an exploded view in axial section of said connector; and

FIG. 4 is a view in axial section of the connector in the mounted and tightened position as on FIG. 1.

According to the exemplary embodiment shown on the Figures a fluid-tight connector according to this invention essentially comprises a first member 1 with a concave end 2, a second member 3 with a convex end 4 mating with or complementary of the concave end 2 of the first member 1 and a sleeve 5 externally coaxial or concentric with the members 1 and 3 and allowing both members to be tightened against each other in end-to-end relationship with their mating convex and concave ends. The sleeve 5 as well seen on FIGS. 3 and 4 comprises at one of its ends a collar 6 adapted to hold back the first member 1 which for that purpose is formed with a shoulder 7 and this sleeve comprises substantially at its middle portion an internally threaded portion 8 allowing it to be screwed onto the external threading 9 provided at the end of the second member 3.

According to the invention this external threading 9 is extended by a threaded portion 10 which as well shown on FIGS. 3 and 4 has a greater diameter than that of said threading 9 and the same thread or pitch than that of the threading 9.

The additional threaded portion 10 of the member 3 may co-operate with a locking washer 11 made from a suitable synthetic material such as a material known under the trademark "VESPEL" or which is polyamide-based and kept in a recessing 12 formed within the end of the sleeve 5 opposite to the end comprising the collar 6.

As well shown in particular on FIGS. 3 and 4 the recessing 12 follows the threaded inner portion 9 of the sleeve 5 and the inner periphery of this recessing has a greater diameter than that of said threaded inner portion 8 of said sleeve 5.

According to a preferred embodiment the external threading 9 of the member 3 and the threaded portion 10 which in a way extends this threading necessarily comprise a same pitch or thread.

The sleeve 5 comprises on its outside periphery and according to the example shown flat sides 13, for instance six flat sides allowing it to be operated by a wrench or spanner and likewise the member 3 also comprises flat sides beyond the threaded portion 10 and designated at 14.

As known per se both pipes (not shown) to be connected or coupled together through the agency of the connector according to the invention will be secured with their ends and for instance through welding onto the end 1a of the member 1 and onto the end 3a of the member 3, respectively.

For an easier understanding of the invention there will now be set forth hereinafter how the mounting or the assembly and the tightening of the connector just described will be carried out.

The first member 1 being at first inserted into the sleeve 5 the member 3 will be screwed into the sleeve 5 and this by means for instance of a wrench or a spanner caused to be engaged with the flat sides 13 and/or 14.

After a screwing stroke of some length the externally threaded portion 10 of the member 3 will engage the locking washer 11 previously accommodated or housed within the recessing 12 and the screwing will be continued until the convex and concave ends 2 and 4 of the members 1 and 3 are caused to come in abutment against each other, respectively, as well shown on FIG. 4. The locking of both members 1 and 3 assembled end-to-end by the sleeve 5 will then be performed and this locking is not at all likely to be impaired under the effect of any stresses or forces whatsoever exerted upon the connector owing to the provision of the self-locking washer 11 between the sleeve 5 and the member 3.

It should be pointed out that on account of the location of the threaded portion 10 recessed or set back with respect to the threaded portion 9 of the member 3, this member 3 may be easily and freely inserted into the sleeve 5 for screwing purposes and this member 3 will in a way be guided while being screwed into the sleeve 5 so that the threaded portion 10 will be caused to properly engage the locking washer 11.

It should be understood that the invention is not at all limited to the embodiment described and illustrated which has been given by way of example only.

On the contrary the invention comprises all the technical equivalents of the means described as well as their combinations if the latter are carried according to its gist and within the scope of the appended claims.

What is claimed is:

1. A fluid-tight connector for joining first and second sections of a pipe-line in axial alignment, said connector including:
    first and second members each having an axial bore;
    a sleeve axially aligned with said members;
    convex and concave mating surfaces, one of said surfaces being on an end of said first member and the other of said surfaces being on an end of said second member;
    said first member being retained within said sleeve by being trapped between said second member and an internal retaining surface of said sleeve;
    said second member having first and second external thread sections, with said first external thread section being disposed between said second external thread section and said end of said second member;
    said sleeve having internal thread means in operative engagement with said external thread sections to draw said mating surfaces into engagement and lock them in engagement;
    said second external thread section being substantially greater in diameter than said first external thread section.

2. A connector according to claim 1 also including a self-locking washer maintained within a recess of said sleeve, said washer being operatively engaged with said second external thread section.

3. A connector according to claim 1 wherein threads of the second external thread section have an inner periphery that is greater in diameter than threads of the first external thread section at their external periphery.

4. A connector according to claim 3 also including a self-locking washer maintained within a recess of said sleeve, said washer being operatively engaged with said second external thread section.

5. A connector according to claim 4 wherein threads of the first and second external thread sections have the same pitch.

6. A connector according to claim 1 wherein threads of the first and second external thread sections have the same pitch.

7. A connector according to claim 6 also including a self-locking washer maintained within a recess of said sleeve, said washer being operatively engaged with said second external thread section.

* * * * *